(12) United States Patent
Thaler et al.

(10) Patent No.: US 6,777,076 B2
(45) Date of Patent: Aug. 17, 2004

(54) GRAPHITE-COATED SHAPED BODY MADE OF SINTERED SILICON CARBIDE

(75) Inventors: Hubert Thaler, Kempten (DE); Karl Schwetz, Sulzberg (DE); Armin Kayser, Buchenberg (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/947,798

(22) Filed: Sep. 6, 2001

(65) Prior Publication Data

US 2002/0074744 A1 Jun. 20, 2002

(30) Foreign Application Priority Data

Sep. 14, 2000  (DE) ......................................... 100 45 339

(51) Int. Cl.[7] .............................................. C04B 41/80
(52) U.S. Cl. ...................... 428/332; 428/336; 428/408; 428/312.2; 428/312.6; 428/319.1
(58) Field of Search ................................ 428/332, 336, 428/408, 312.2, 312.6, 319.1, 698, 704

(56) References Cited

U.S. PATENT DOCUMENTS

| 4,701,427 A | * | 10/1987 | Boecker et al. |
| 4,828,728 A | * | 5/1989 | Dimigen et al. |
| 5,298,470 A | * | 3/1994 | Chia et al. |
| 5,763,072 A | * | 6/1998 | Kato et al. |
| 5,834,387 A | * | 11/1998 | Divakar et al. |

FOREIGN PATENT DOCUMENTS

JP  59-184769  10/1984

OTHER PUBLICATIONS

English Translation of JP application JP 59–184769.

* cited by examiner

*Primary Examiner*—Archene Turner
(74) *Attorney, Agent, or Firm*—Collard & Roe, P.C.

(57) ABSTRACT

Shaped body based on polycrystalline SiC and having a density of greater than 90% of its theoretical density and an adherent graphite layer on its surface, wherein the graphite layer is crystalline, has a thickness of 0.1–100 $\mu$m and has been produced by thermal surface decomposition of the SiC after it has been sintered to closed porosity.

5 Claims, 4 Drawing Sheets

Scanning electron micrograph of the fracture surface of an sintered SiC seal ring with an adherent graphite layer according to the invention (1 900°C/90 min)

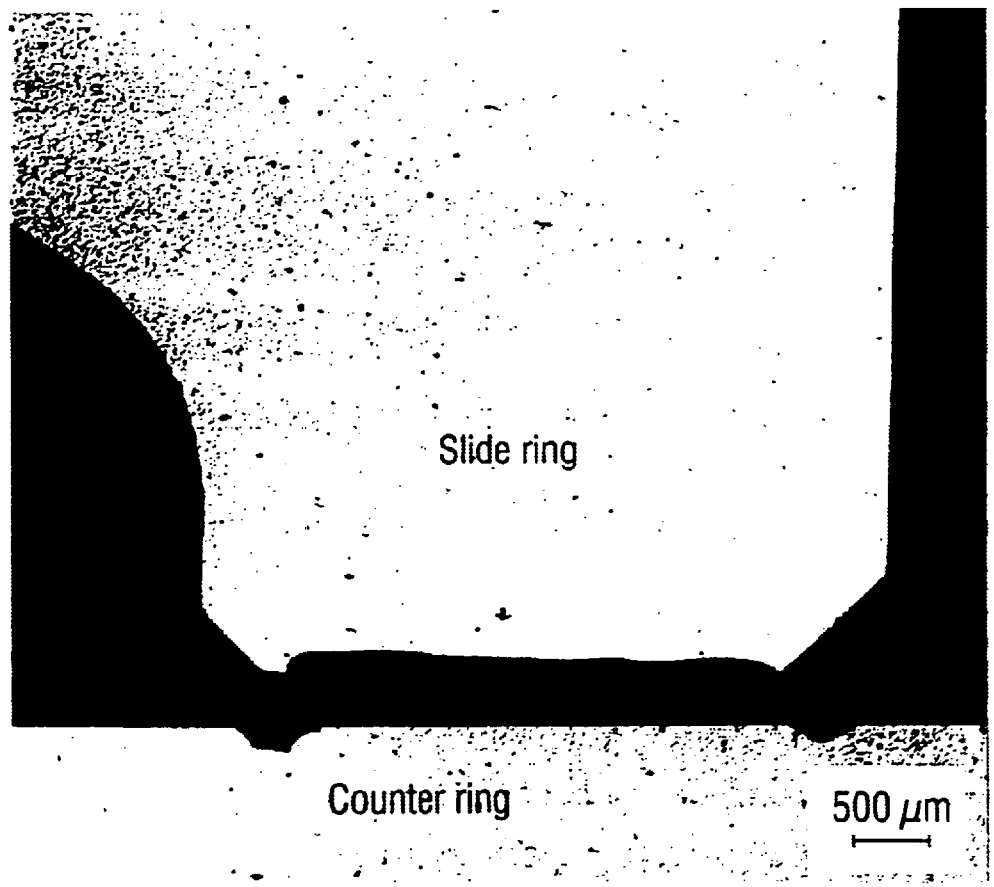
Fig. 1: Optical micrograph of polished sections of corroded sintered SiC seal rings (Direction of polished section: perpendicular to the functional surface)

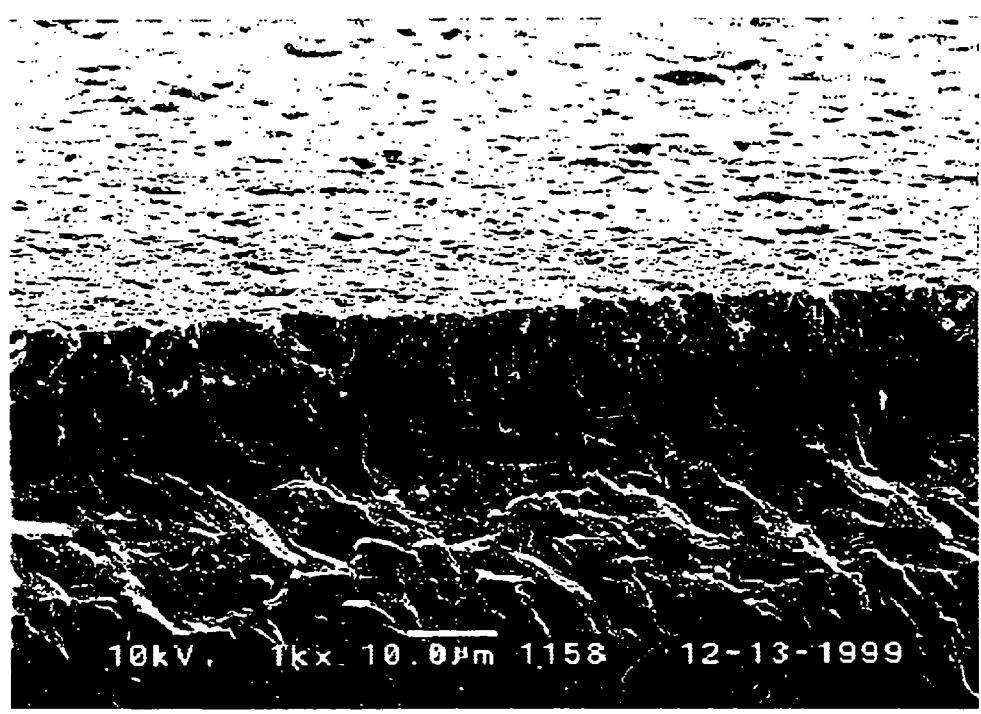
Fig. 2: Scanning electron micrograph of the fracture surface of an sintered SiC seal ring with an adherent graphite layer according to the invention (1 900°C/90 min)

GRAPHITE-COATED SHAPED BODY MADE OF SINTERED SILICON CARBIDE

BACKGROUND OF THE INVENTION

1. Field of the Invention

The present invention relates to a graphite-coated shaped body made of sintered silicon carbide.

2. The Prior Art

Dense, solid-state sintered SiC has a combination of valuable properties such as high hardness and wear resistance, high-temperature resistance, high thermal conductivity, thermal shock resistance and also oxidation and corrosion resistance. Due to these properties, solid-state-sintered SiC has now been introduced as virtually ideal material for sliding bearings and mechanical face seals subject to wear stresses, e.g. for structural components in chemical apparatus and mechanical engineering.

It is known from U.S. Pat. No. 5,939,185 that SiC is also corrosion resistant toward hot water at a minimized grain boundary content. This results from a bimodal, coarsely crystalline platelet microstructure of the SiC and by the additional presence of graphite which is present as a particulate accompanying phase in the SiC matrix of the seal ring. This graphite reduces the tribochemical grain boundary corrosion which commences at working temperatures of above 200° C. A disadvantage of mechanical face seals made of this coarsely crystalline SiC-material is a very long running-in time (≈200 h). In addition, this material when installed in an electrically insulated manner (e.g. as rotating seal ring in a boiler feed pump) has also displayed corrosion phenomena on the SiC ring which could not be explained in chemical or tribochemical terms (FIG. 1). The contour of the damaged ring shape cannot occur as a result of mechanical and chemical attack. Damage beyond the functional surfaces was also apparent in the absence of mechanical stress. Such corrosion phenomena have been termed electrocorrosion (See, J. Nosowicz and A. Eiletz: "*Operating Performance of Mechanical Seals for Boiler Feed Pumps*"; in: *BHR-Conference of Fluid Sealing*, Maastricht 1997, 341–351).

Problems during production, e.g. crack formation during shaping and subsequent sintering of graphite-containing SiC, can be prevented if, instead of incorporating graphite into the SiC microstructure, a graphite layer is applied to the surface of the sintered SiC body.

JP04041590A of NIPPON CEMENT KK discloses the production of a graphite-coated shaped SiC body in which the graphite layer is formed on an open-pored shaped SiC body by chemical vapor deposition (CVD) from hydrocarbons in a mixture with hydrogen. The process is complicated and expensive. In addition, the graphite layer deposited by means of CVD methods is not firmly anchored to the SiC substrate. The CVD-graphite layer serves primarily to seal the open porosity and as lubricant which effects an improvement in the sliding properties via introduction of carbon into the pores of the SiC. To achieve this, the SiC substrate has to be open-pored since the pores act as reservoirs for the graphite lubricant.

SUMMARY OF THE INVENTION

It is an object of the present invention to provide a shaped body made of SiC which has been sintered so as to be gastight (=closed porosity), has a density of greater than 90% of its theoretical density and has a graphite layer on its surface, in which body the graphite layer adheres firmly to the SiC substrate and electrocorrosion is prevented.

This object is achieved according to the invention by a shaped body comprising polycrystalline SiC which has a graphite layer which has a thickness of 0.1–100 μm and which has been produced by thermal surface decomposition of the SiC after it has been sintered to closed porosity.

The graphite layer preferably has a thickness in the range 0.5–20.0 μm. The graphite layer is preferably single-layered.

The graphite layer preferably has a specific electrical resistance of from 0.5 to 5.0 mΩcm.

The graphite layer particularly preferably has a specific electrical resistance of from 0.8 to 1.9 mΩcm.

The graphite layer is preferably present on a tribologically active functional surface and/or on a tribologically inactive outer surface of the shaped body.

On the tribologically active functional surfaces, the graphite layer improves the running-in characteristics and the coefficient of friction of the shaped body of the invention under conditions of mixed friction or of partial dry running.

On the outer surfaces of the shaped body, the graphite layer prevents electrocorrosion. It has been found that electrically insulated installation of a usual SiC slide ring leads to a buildup of potential and as a consequence to corrosion phenomena on the SiC ring. This electrical corrosion can be prevented by discharging the potential via electrically conductive contacting of the SiC slide ring. Since a shaped SiC body does not have sufficient surface conductivity due to the high specific resistance of SiC of about $10°-10^4$ Ωcm, the discharge of the potential is not reliably possible in the case of a conventional SiC material. In the case of the shaped body of the invention, the potential is discharged via the firmly adhering electrically conductive graphite layer on the surface of the shaped body.

The shaped body of the invention comprises a conventional solid-state sintered SiC body which has closed porosity and is covered with a graphite layer produced by surface decomposition and having a thickness of from 0.1 to 100 μm.

The shaped body of the invention preferably consists of 70–99.7% by weight of polycrystalline SiC having an SiC crystallite size of from 1 to 2000 μm, plus 0.2–5.0% by weight of boron, boron compounds, Al, Al compounds, and also 0.1–25.0% by weight of additional carbon (in the form of amorphous carbon and/or graphite), with the shaped body being able to have a total porosity of up to 10% by volume in the form of independent, closed pores. All percents by weight are based upon the total weight of the shaped body.

The invention also provides a process for producing a shaped body according to the invention.

This process comprises heating a conventional sintered SiC body having closed porosity to a temperature above the decomposition temperature of SiC under a protective gas atmosphere (Ar, He, etc.) ranging in pressure from vacuum to 1 bar. The thermal surface decomposition of the sintered SiC shaped body proceeds according to the following reaction:

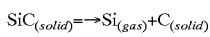

$$SiC_{(solid)} = \rightarrow Si_{(gas)} + C_{(solid)}$$

The carbon formed remains on the surface as a graphite layer (See FIG. 2), while the silicon formed vaporizes through the graphite layer and condenses in cold regions of the furnace.

The shaped body used in the process of the invention may have been produced by any solid-state sintering process.

In the process of the invention, preference is given to heating an usual sintered SiC body having closed porosity to a temperature between 1600° C. and 2200° C., preferably between 1800° C. and 2000° C. This temperature is held for a period of from 10 to 180 minutes, preferably from 30 to 90 minutes. The formation of the graphite layer on the surface occurs during this time.

An internal furnace pressure of from 1000 mbar to $10^{-5}$ mbar, preferably from 1 to 50 mbar, is preferably maintained during the process.

The coated shaped body is subsequently cooled to room temperature in a customary manner.

The graphite layer formed according to the invention is predominantly hexagonal 2H-graphite. This can be seen from X-ray diffraction patterns of SiC surfaces decomposed at 1800° C.–2000° C. under reduced pressure by way of the three reflections at $2\Theta=26.6°/45.4°$ and $54.70°$ (CuKa radiation). The thickness of the graphite layer can be set in a targeted manner by varying the process parameters temperature/hold time/pressure within the abovementioned limits. This is illustrated in the bar chart in FIG. 3.

The specific electrical resistance (FIG. 4) of the graphite as a function of the formation temperature does not show a continuously increasing or decreasing behavior. Thus, 2 competing mechanisms occur in the process of the invention and lead to a resistance maximum. The maximum at 1.8 mΩcm corresponds to the commercial high-purity graphite grade EK88 from Ringsdorff (Bonn).

At 1600° C. and less, graphite layers are no longer formed even under a very good vacuum ($<10^{-3}$ mbar) and above 2050° C. the decomposition of SiC under an internal furnace pressure of 10 mbar becomes too great. Up to 2200° C., this can be countered by means of Ar partial pressure up to ambient pressure.

The process of the invention can be carried out directly subsequent to the customary sintering to produce a shaped SiC body, but it is likewise possible to carry out the process only after final machining of the sintered shaped body.

The first method is advantageous for cost reasons, since it can be carried out in the same sintering cycle as the production of the initial sintered body. However, it can only be carried out when the sintered shaped body meets the specifications required for the respective application (e.g. roughness, dimensional tolerances such as diameter/height/ wall thickness) prior to carrying out the process of the invention without further machining. In this case, the procedure is preferably as follows: subsequent to the sintering to closed porosity of a sintered SiC body carried out in a known manner, the parameters temperature/hold time and internal furnace pressure are selected as described above. This results in formation of the graphite layer by decomposition of the SiC during the cooling phase of the sintering cycle.

If final machining of the sintered SiC shaped body is necessary to meet the specifications required by the respective application (dimensions, surface roughness), the process of the invention is carried out only after this final machining. It is then necessary to carry out the process of the invention as a separate process step. This is advantageously carried out in a furnace customary for SiC sintering using a large number of SiC shaped bodies to be coated.

Subsequent to the process of the invention, no additional quality tests are necessary, since no change in the dimensions and no distortion of the SiC shaped body occurs at the heating temperatures employed in the process of the invention.

The uncontrolled formation of graphite layers in the sintering of SiC under reduced pressure is described in the Japanese patent specification JP59184769 A of Hitachi CHEM. Co LTD. However, this document specifically recommends sintering an SiC sintered body under a relatively high Ar partial pressure at temperatures above 1800° C. This is to prevent decomposition of the SiC and to avoid an undesired carbon layer caused by decomposition. According to the process of the invention, the surface decomposition is brought about in a controlled manner only after sintering to closed porosity. Contrary to the invention, in the Japanese document the surface decomposition of SiC to form graphite occurs at an early stage during the pressureless sintering process, which leads to undesirably thick and locally inhomogeneous layers. The graphite-coated SiC sintered body mentioned in a comparative example in this Japanese application is unsuitable as a sliding material, since the graphite layer has a thickness of 500 μm. A graphite layer of this thickness is inhomogeneous and is not firmly bound to the underlying SiC. As the thickness of the layer increases, diffusion problems of the gaseous silicon through the graphite layer being formed result in stress cracking problems and bubble formation at the boundary between SiC and graphite. These increase the tendency for the graphite layer to become peeled off from the SiC substrate. It is generally true that the tendency for the layer to become delaminated is proportional to the thickness of the layer.

The present invention further provides for the use of a shaped body according to the invention as a wear part and provides a wear part consisting of a shaped body according to the invention. The wear parts are preferably slide rings or counterrings of a mechanical face seal, or are parts for sliding bearings. The present invention also provides mechanical face seals comprising a wear part according to the invention.

Examples of such seals are as follows: A mechanical face seal comprises an SiC slide ring and a graphite counterring, wherein the SiC slide ring is a shaped body. according to the invention.

A mechanical face seal comprises an SiC slide ring and an SiC counterring, wherein the SiC slide ring or the SiC counterring is a shaped body according to the invention. In an embodiment of this mechanical face seal, the sliding ring and counterring have an SiC microstructure having a bimodal distribution consisting of equiaxial or plateletlike crystallites having a diameter of up to 50 μm and plateletlike crystallites having a length of up to 2000 μm.

In a further embodiment of this mechanical face seal, the slide ring and counterring have a monomodal, fine-grained SiC microstructure with crystallite diameters up to 10 μm. In this embodiment, one of the two rings is a shaped body according to the invention.

In another embodiment of a mechanical face seal according to the invention, comprising a rotating SiC slide ring and a stationary SiC counterring. The rotating slide ring has at least 98% by volume based upon the total volume of the rotating ring of a monomodal, a fine-grained SiC microstructure having crystallite diameters up to 10 μm. The stationary counterring has a bimodal coarse-grained plateletlike microstructure having a platelet length of up to 2000 μm, with the functional surface of at least one ring having a graphite layer. In yet another embodiment of a mechanical face seal according to the invention, comprising a rotating SiC slide ring and a stationary SiC counterring, at least one of the rings has a microstructure with spherical, closed pores having a size of 40–100 μm and at least one of the rings has a graphite layer.

A graphite-coated SiC shaped body according to the invention is preferably employed in a hard/hard pairing.

A graphite-coated SiC shaped body according to the invention is also suitable for hard/soft pairings in seals.

Hard/hard means that ring and counterring consist of a sintered hard material, e.g. ring and counterring are made of SiC. Here, an SiC ring coated according to the invention also counts as hard.

Hard/soft means that one ring consists of a hard material and the opposite ring comprises graphite. (E.g. slide ring of SiC and counterring of graphite).

A graphite layer on functional surfaces which have been machined in the sintered state also has a positive effect on the running-in behavior of the seal. In further use in a seal, the graphite layer also prevents hydrothermal grain boundary corrosion. It thus increases the life of a sliding ring seal.

A further positive effect which is found is that a coarse-grained, particularly corrosion-resistant SiC (commercially available from ESK (Kempten) under the name EKasic W) which has been provided according to the invention with a graphite layer also runs very well against fine-grained SiC. The mechanical stress, particularly on start-up, is low from the beginning in this case. Since the cause of premature failure is predominantly in the start-up phase (=high mixed friction region), the percentage of failures during use can be drastically reduced in this way. Such initial damage is frequently observed in the case of uncoated hard/hard pairings, particularly for mechanical face seals made of SiC materials having different microstructures.

The graphite layer on EKasic W also improves the running-in behavior of a mechanical face seal in another respect. The running-in characteristics of this material are normally somewhat rough. The graphite coating of the functional surface corrects this to give a quiet and smooth start-up phase and at the same time further reduces the susceptibility to grain boundary attack.

The good electrical conductivity of the graphite layer prevents a buildup of potential by surface conduction, so that electrocorrosion cannot occur.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawing, wherein similar reference characters denote similar elements throughout the several views:

FIG. 1 shows, in cross section, a typical form of electrocorrosion on a mechanical face seal according to the prior art which has been subjected to practical use. The slide ring (EKasic D, uncoated) has been hollowed out during use, while only the two projecting edges on the inside and outside have cut into the counterring (EKasic D, uncoated). The central area of the counterring remains virtually untouched.

FIG. 2 shows a scanning electron micrograph of the fracture surface of a pressureless-sintered SiC sliding ring which has been coated with graphite according to the invention. The graphite layer was produced by the process of the invention (pressure: 10 mbar/temperature: 1900° C./hold time: 90 min). The about 6 $\mu$m thick graphite layer can be seen clearly.

DETAILED DESCRIPTION OF PREFERRED EMBODIMENTS

Figure 3A:
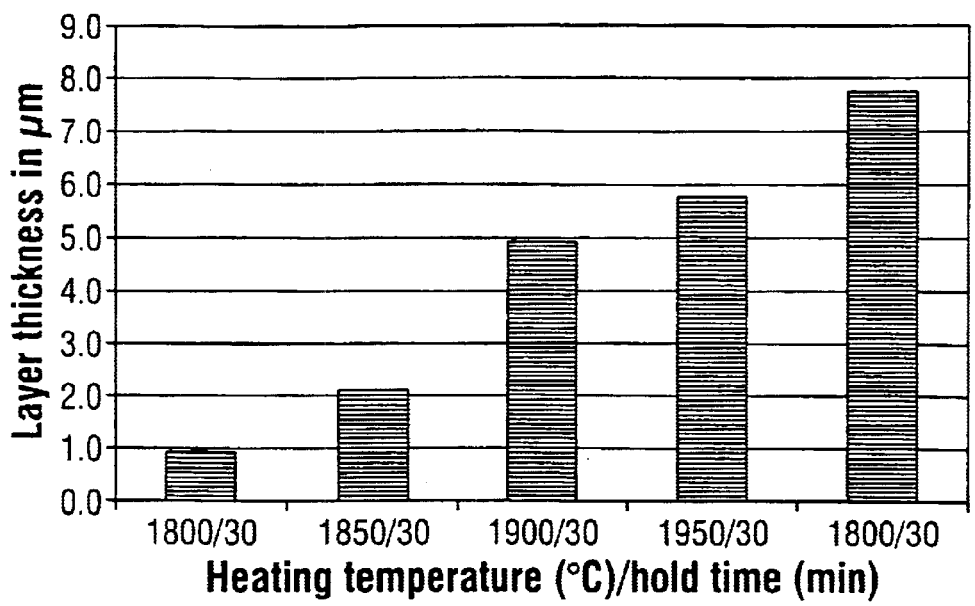
FIG. 3 shows the thicknesses of graphite layers according to the invention on SiC a) as a function of the heating temperature at a hold time of 30 minutes b) as a function of the hold time at 1850° C. and 1900° C.
Figure 3B:
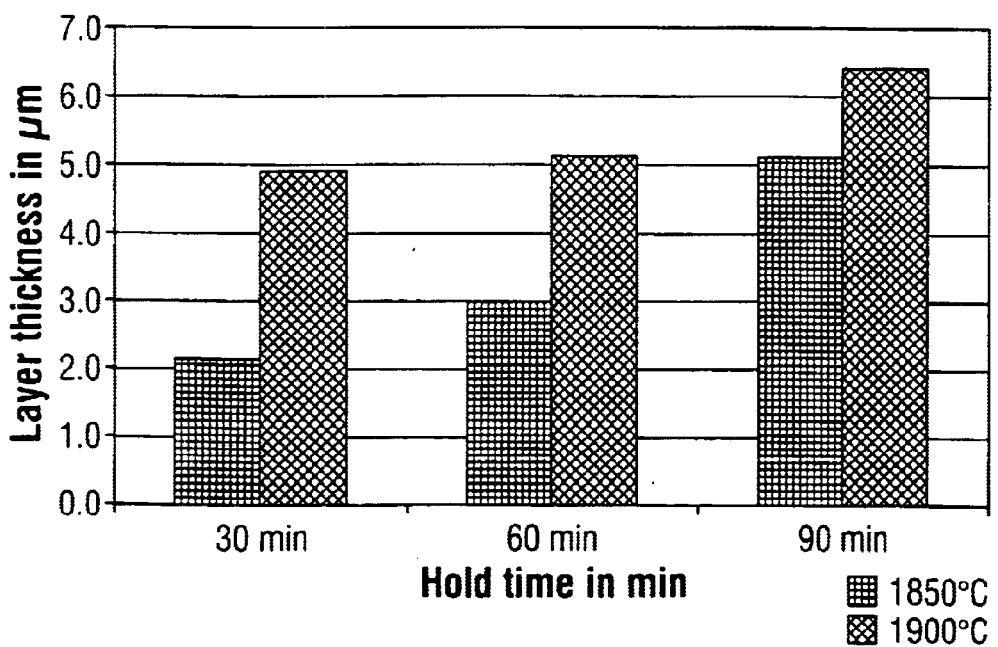
Figure 4A:
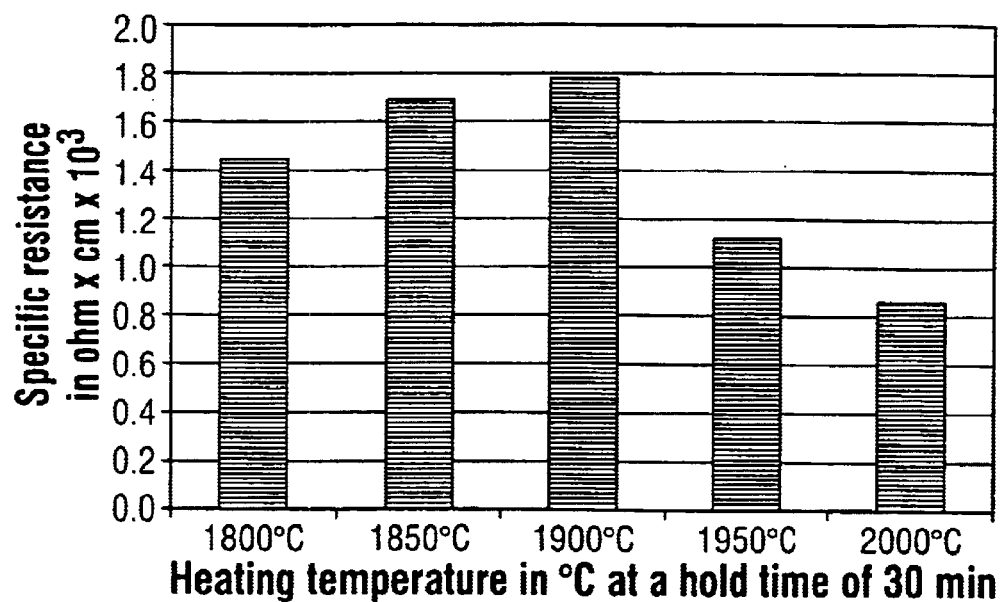
FIG. 4 shows the specific electrical resistance of a graphite layer according to the invention a) as a function of the heating temperature at a hold time of 30 minutes b) as a function of the hold time at 1850° C. and 1900° C.
Figure 4B:
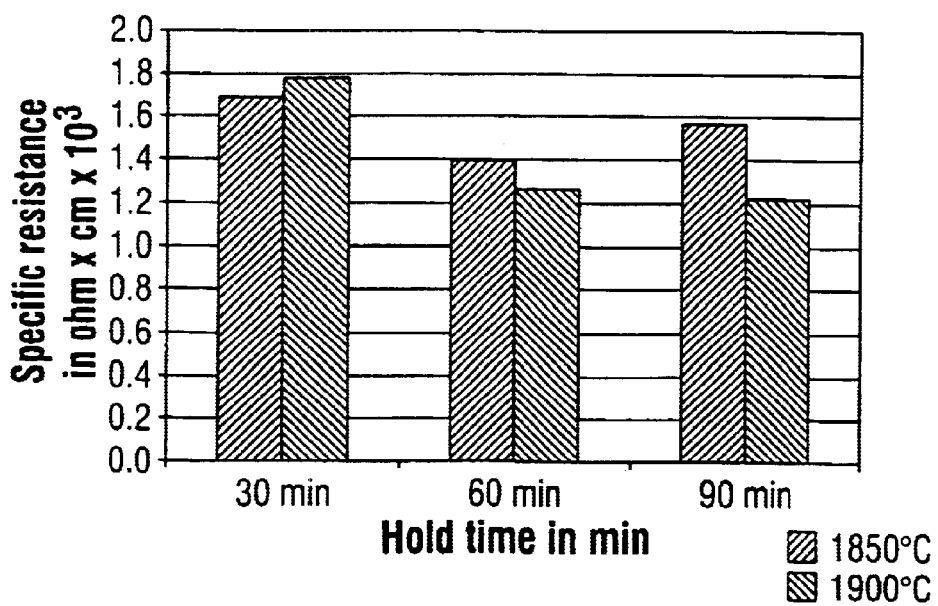

The present invention is further illustrated by reference to the following examples, which are not to be deemed limitative of the present invention in any manner thereof.

EXAMPLES 1–9

Production of Sintered Bodies According to the Invention

Pressureless-sintered SiC shaped bodies having a sintered density of $\geq 3.10$ g/cm$^3$ were provided with a graphite layer by means of the process of the invention. The process was carried out in a high-temperature vacuum furnace having graphite heating elements. The sintered SiC bodies were initially heated to 1050° C. over a period of 60 minutes under a rotary pump vacuum in the range 1–10 mbar. They were subsequently heated to 1700° C. over a period of about 80 minutes in accordance with a pyrometer-guided temperature program (corresponds to a heating rate of about 500° C./h) and then heated to 1800° C. over a further 15 minutes (corresponds to a heating rate of 400° C./h).

From this point, the variable target temperature of Examples 1–9 (1800° C.–2000° C.; See Table 1) was approached at a heating rate of 300° C./h. In these examples, the hold time was varied from 30 to 60 to 90 minutes at 2 mean temperatures (See Table 1). The variable experimental parameters temperature/hold time are shown in Table 1. The electrical conductivity and the specific electrical resistance of the graphite layer of the graphite-coated SiC shaped bodies according to the invention obtained in this way are likewise shown in Table 1.

The layer formation temperatures are strongly dependent on the pressure of the firing atmosphere. Thus, graphite layers could be produced at only 1780° C. under a pressure of $1\times10^{-1}$ mbar. Under an Ar partial pressure of about 300 mbar, layer formation occurred only at 2150° C. Preference is given to using gas pressures of from 1 to 10 mbar at temperatures of from 1800° C. to 2000° C.

TABLE 1

Electrical conductivity and specific electrical resistance of C layers on SiC measured by the Van der Pauw method**

| Example | Temperature/ hold time ° C./min* | C layer thickness $\mu$m | Conductivity kS/m | Resistance $\Omega$cm |
| --- | --- | --- | --- | --- |
| 1 | 1 800/30 | 0.9 | 69.1 | 1.45 10$^{-3}$ |
| 2 | 1 850/30 | 2.1 | 59.2 | 1.69 10$^{-3}$ |
| 3 | 1 850/60 | 3.0 | 72.1 | 1.39 10$^{-3}$ |
| 4 | 1 850/90 | 5.1 | 63.9 | 1.57 10$^{-3}$ |
| 5 | 1 900/30 | 4.9 | 56.2 | 1.78 10$^{-3}$ |
| 6 | 1 900/60 | 5.1 | 79.6 | 1.26 10$^{-3}$ |
| 7 | 1 900/90 | 6.4 | 82.0 | 1.22 10$^{-3}$ |
| 8 | 1 950/30 | 5.8 | 89.3 | 1.12 10$^{-3}$ |
| 9 | 2 000/30 | 7.8 | 116.4 | 0.86 10$^{-3}$ |
| Comparison | Sic surface | (= 0.1) | 0.05 | 2 10$^3$ |

*at 1–10 mbar gas pressure
**4-point measurement method, contact spacings: 10.00 mm in square (microvoltmeter: Keithley, model 197 A)

EXAMPLES 10–11

Use of the Slide Rings According to the Invention on a Burgmann High-pressure Test Bench

EXAMPLE 10

A mechanical face seal according to the invention (slide ring according to the invention: SSiC having a fine-grained equiaxial microstructure and a 5 μm thick graphite layer/counterring: SSiC having a fine-grained equiaxial microstructure) was used in a seal loaded directly with 12 bar in demineralized water. After 48 hours at a sliding speed of 7.6 m/sec, the experiment was interrupted and was stopped after a further running time of 500 hours. It was found that the running-in time tends to virtually 0, since very quiet and smooth running is obtained from the beginning. Ceramographic examination of the functional surfaces both after 48 hours and after a further 500 hours showed an undamaged contact track.

EXAMPLE 11

A mechanical seal according to the invention (slide ring according to the prior art: SSiC having a fine-grained, equiaxial microstructure/counterring according to the invention: coarse-grained microstructure with SiC plateletlike crystallites up to 2000 μm in size, commercially available under the name EKasic® W but provided with a 5 μm thick graphite layer) was used in a seal directly loaded with 12 bar in demineralized water. After 48 hours at a sliding speed of 7.6 m/sec, the experiment was interrupted and was stopped after a further running time of 500 hours.

The running-in behavior of the seal corresponded to Example 10. This example particularly clearly demonstrates the advantageous effect of the graphite layer; a sliding ring combination as used here but without graphite layer shows damage to the functional surfaces after only 48 hours under these running conditions.

Ceramographic examination of the functional surfaces showed no such damage even after a running time of 500 h, but instead showed ideally run-in functional surfaces.

Accordingly, while a few embodiments of the present invention have been shown and described, it is to be understood that many changes and modifications may be made thereunto without departing from the spirit and scope of the invention as defined in the appended claims.

What is claimed is:

1. A shaped body comprising polycrystalline SiC having a surface and having a density of greater than 90% of theoretical density and an adherent layer consisting of graphite on said surface;

wherein the graphite layer is crystalline, has a thickness of 0.1–100 μm and has been produced by thermal surface decomposition of the SiC after it has been sintered to closed porosity.

2. A shaped body as claimed in claim 1, wherein the graphite layer has a thickness in the range 0.5–20.0 μm.

3. A shaped body as claimed in claim 1, wherein the graphite layer has a specific electrical resistance of from 0.5 to 5.0 mΩcm.

4. A shaped body as claimed in claim 3, wherein the graphite layer has a specific electrical resistance of from 0.8 to 1.9 mΩcm.

5. A shaped body as claimed in claim 1, which comprises

70–99.7% by weight of SiC having an SiC crystallite size of from 1 to 2000 μm, 0.2–5.0% by weight of a substance selected from the group consisting of boron, boron compounds, Al, and Al compounds, and 0.1–25.0% by weight of additional carbon selected from the group consisting of amorphous carbon, graphite and mixtures thereof;

wherein the shaped body may have a total porosity of up to 10% by volume in the form of independent closed pores; and all percents by weight are based upon the total weight of the shaped body.

* * * * *